Dec. 20, 1932.  F. W. WADE  1,891,854
COMBINED LAWN MOWER AND SPRINKLER
Filed Sept. 20, 1929  4 Sheets-Sheet 1

Francis W. Wade,
INVENTOR
BY Victor J. Evans
ATTORNEY

Dec. 20, 1932.  F. W. WADE  1,891,854
COMBINED LAWN MOWER AND SPRINKLER
Filed Sept. 20, 1929   4 Sheets-Sheet 2

Dec. 20, 1932.  F. W. WADE  1,891,854
COMBINED LAWN MOWER AND SPRINKLER
Filed Sept. 20, 1929  4 Sheets-Sheet 3

Francis W. Wade,
INVENTOR
BY Victor J. Evans
ATTORNEY

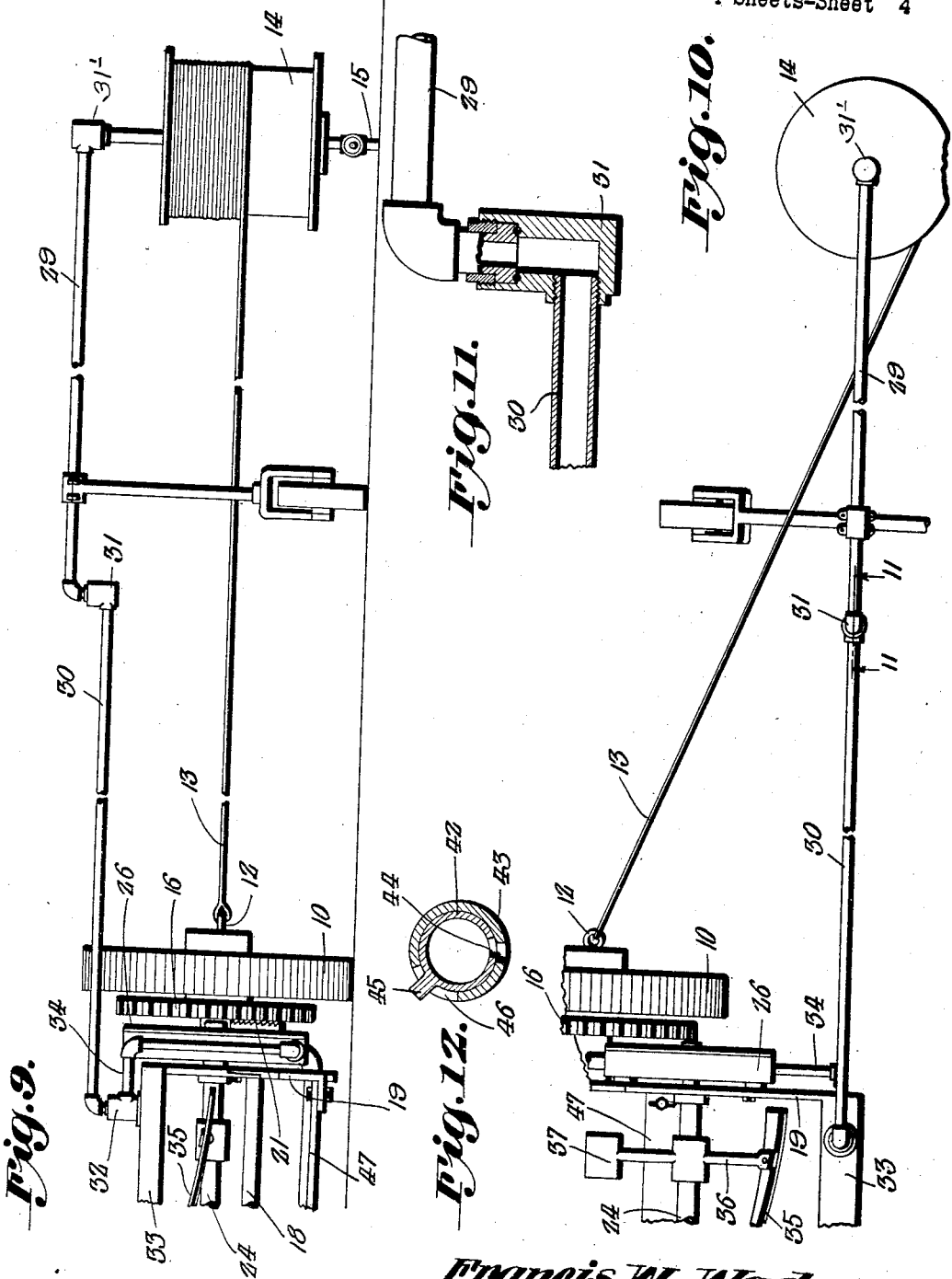

Patented Dec. 20, 1932

1,891,854

UNITED STATES PATENT OFFICE

FRANCIS W. WADE, OF CANON CITY, COLORADO

COMBINED LAWN-MOWER AND SPRINKLER

Application filed September 20, 1929. Serial No. 393,982.

This invention relates to a combined lawn mower and sprinkler embodying among other characteristics means whereby the mower may be driven by the pressure of the water delivered to the mower for sprinkling purposes.

An additional object of the invention embodies guide means for the mower whereby the latter will be automatically controlled so that it may be operated in spiral paths and these increasing in extent from a definite point so that the said mower will travel in circuitous courses in successive order.

An additional object of the invention contemplates the provision and arrangement of means whereby the fluid conduit may be maintained in constant communication with the sprinkler while the mower is in use.

An additional object of the invention consists in the provision of a source of motive power for the mower to be operated by the pressure of the fluid ultimately delivered to the sprinkler.

More specifically stated, the cutting mechanism for the mower and the sprinkler means are so related for concurrent successive operation as the sprinkling fluid will function to drive the cutting mechanism and also to advance the mower.

With the above and other objects in view, the invention further consists of the following novel features and details of construction, to be hereinafter more fully described, illustrated in the accompanying drawings and pointed out in the appended claims.

In the drawings:—

Figure 5 is a sectional view taken on line 5—5 of Figure 1.

Figure 6 is a longitudinal sectional view taken through the driving mechanism for the mower wheels.

Figure 9 is a fragmentary elevation of the device while in use.

Figure 10 is a fragmentary top plan view showing the parts of the combined lawn mower and sprinkler in the position as shown in Figure 9.

Figure 11 is a detail sectional view taken through the universal joint connection on line 11—11 of Figure 10.

Figure 12 is a horizontal sectional view taken on line 12—12 of Figure 2 through the sprinkler and pressure regulating means therefor.

Figure 1:
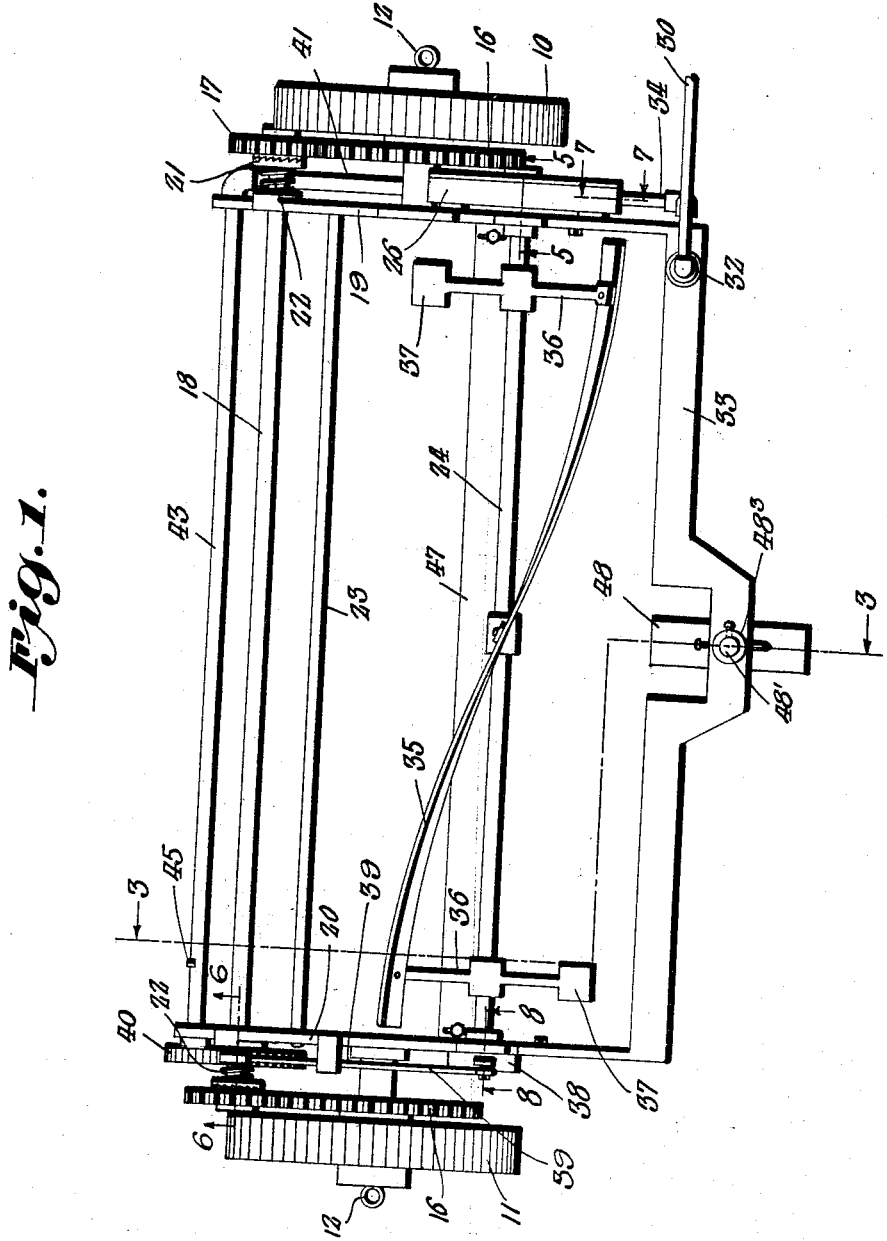
Figure 1 is a fragmentary top plan view of the combined lawn mower and sprinkler constructed in accordance with the invention.
Figure 2:
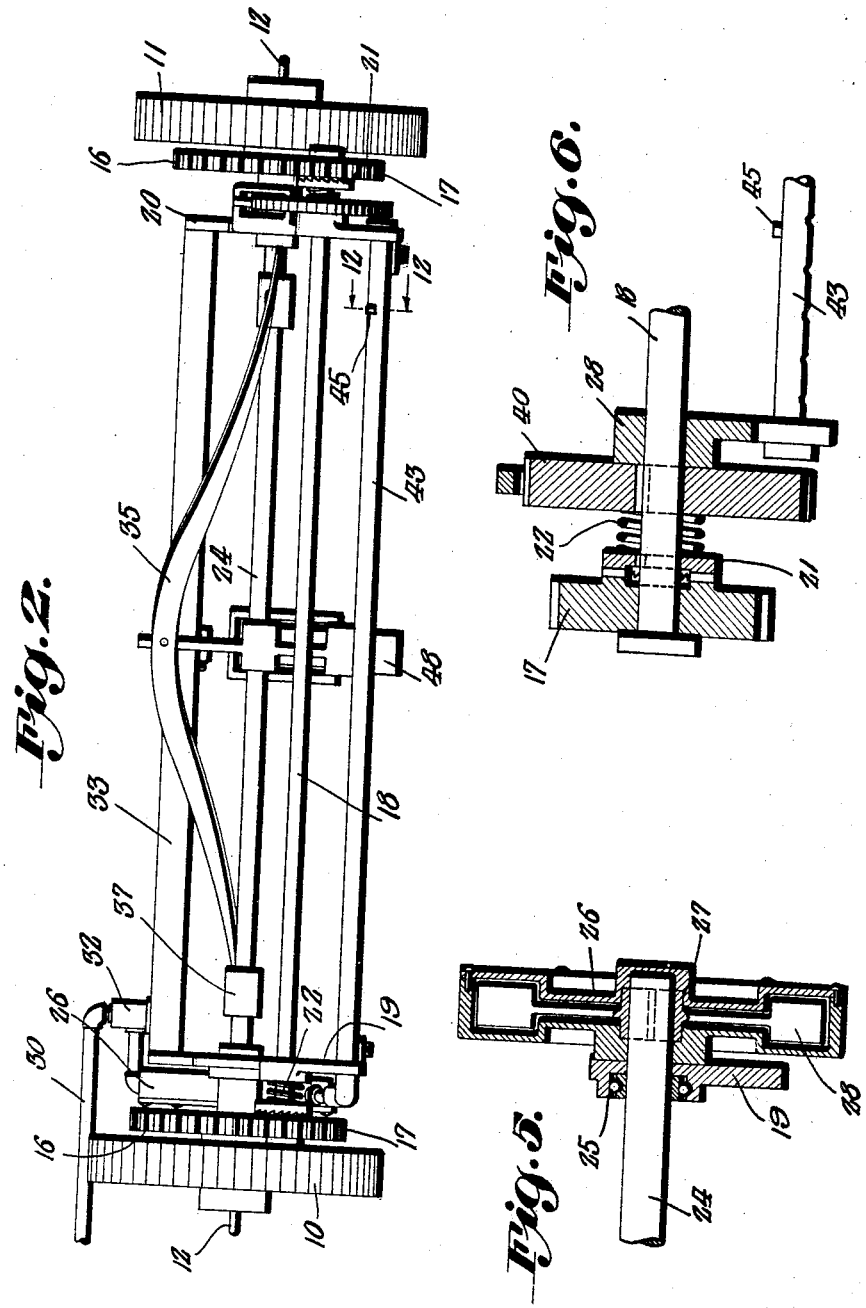
Figure 2 is a fragmentary elevation of the same looking from rear to front.

Referring to the drawings in detail wherein like characters of reference denote corresponding parts, the reference characters 10 and 11 indicate the ground engaging wheels of the mower having rings or screw eyes 12 swivelly connected centrally of the longitudinal axes thereof for connection with a cable or rope 13 wound upon a drum 14, and the latter may be rigidly supported upon a hydrant pipe 15 in the manner shown in Figure 9 of the drawings.

Gear members 16, fixed or otherwise rigidly connected with the ground engaging wheels 10 and 11 for simultaneous rotation therewith, are designed for meshing engagement with relatively small gears 17 journaled upon the ends of a shaft member 18 horizontally disposed between the ground engaging wheels. Side frames 19 and 20 respectively, horizontally disposed between the ground engaging wheels, are apertured to facilitate accommodation respective ends of the shaft member 18 therethrough in the manner suggested in Figure 1 of the drawings. Ratchet gears 21, carried upon the shaft member 18, are adapted for operative connection with the idler gears 17 incident to the provision of ratchet faces provided upon the adjacent sides thereof.

Compression springs 22, encircling portions of the shaft member 18, are sprung at their end convolutions against the adjacent sides of the side frames 19 and 20 and the innermost faces of the ratchet gears 21. Such arrangement will permit the inside ground engaging wheel of the mower to ratchet past the gear connections in order that the aforementioned wheel may rotate more slowly than the companion outermost ground engaging wheel to relieve binding action therebetween and to prevent tearing up of the grass sod. Arranged between the side frames 19 and 20 is a stay rod 23, the latter being made fast thereto in any suitable manner and serves to maintain these side frames in spaced relation to each other. A blade shaft 24, also carried by the side frames 19 and 20, is journaled within bearings 25 and subsequently projected at one end within a housing 26 for fixed connection with the hub 27 of a water motor having a multiplicity of blades or fins 28 radiating therefrom.

A water conduit including the pipe sections 29 and 30 is in communication with the hydrant 15 and these sections are pivotally connected together by a hinge coupling 31 so as to effect a break joint between said pipe sections. The pipe section 29 at its end next to the hydrant 15 is pivotally connected thereto at 31' so that this section may swing in a horizontal plane. A branch pipe 34, through the medium of the union 32, is joined with the pipe section 30 at the end next thereto and this branch 34 leads to the housing 26. It will be apparent that the pipe section 30 is capable of swinging movement with relation to the pipe section 29, which latter revolves or swings relative to the hydrant pipe 15. It is preferable to have the union 32 of a kind so that the pipe section 30 connected thereto will have pivot association with this union. The pressure of water through the pipes 29, 30 and 34 against the blades 28 will cause the hub 27 to rotate and thus the shaft 24 will be driven thereby. In that the pipe sections 29 and 30 are pivotally connected together and are pivotally connected respectively with the pipes 15 and 34, the mower may move toward and away from the hydrant 15 as said mower moves around the latter.

The opposite end of the blade shaft 24 carries a disk 38 thereon having eccentric connection with a pitman rod 39 through the employment of a shouldered cap screw 24' threadedly engaged with a nut 39', slidably and adjustably arranged in a cross section T-shaped slot $39^2$ horizontally disposed within the outer face of the disk. This form of pitman rod connection will afford the lengthening and shortening of the stroke of the pitman rod whereby the speed of travel of the machine compared to the speed of rotation of the blade 35 may be varied. A pawl $39^3$ carried upon the opposite end of the pitman rod is engageable with the teeth of a ratchet gear 40 to control the outermost of the ratchet gear connections and immediate ground engaging wheel.

A discharge pipe 41, for the housing of the water motor, is in communication with a tubular member 42 telescopically associated with a cylindrical housing 43, each of which has perforations or openings 44 therein adapted for selective alignment for registration as will be apparent in the following description of the invention. The orifices or openings in the telescopically associated pipes will provide a sprinkler for the lawn after the same has been cut and the back pressure of the water therein incident to the size of the orifices and degree of registration thereof will regulate the speed of travel of the mower. Such regulation is accomplished through the provision and arrangement of an adjusting lever 45 carried by and projecting from the tubular member 42 and extended an appreciable distance outwardly through a slot 46 in the casing 43 as best illustrated in Figure 12 of the drawings.

A stationary blade 47, carried by and adjustably mounted between the side frames 19 and 20, is adapted for use in conjunction with the blade 35 and which may be adjusted with relation to the sod to predetermine the depth of cut of the shoots or blades of grass extending therefrom through the employment of a wheel or roller 48 having adjustable connection with the bracket arms 33.

Figure 3:
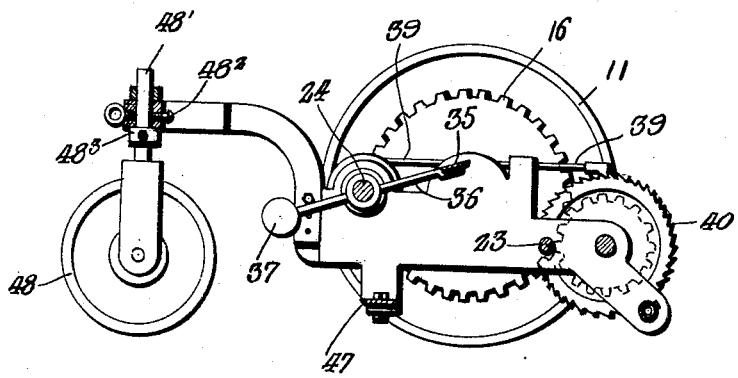
Figure 3 is a sectional view on the line 3—3 of Figure 1 looking in the direction of the arrows.
Figure 4:
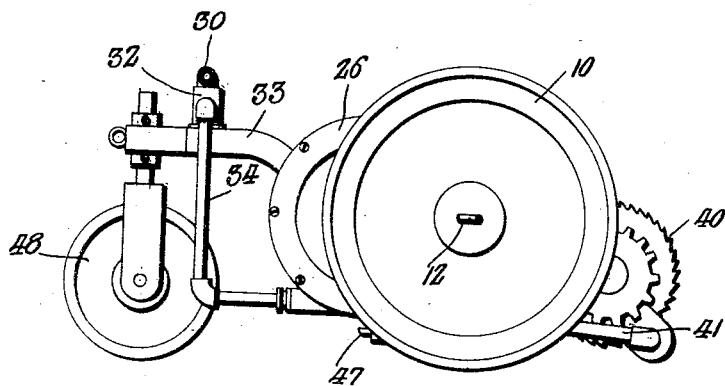
Figure 4 is an end elevation with the sprinkler pipe in section.
Figure 7:
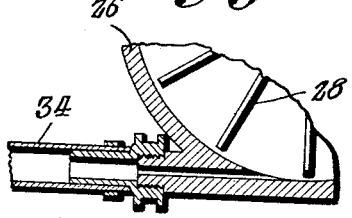
Figure 7 is a fragmentary detail sectional view taken on line 7—7 of Figure 1 through the water motor and fluid conduit connection therewith.
Figure 8:
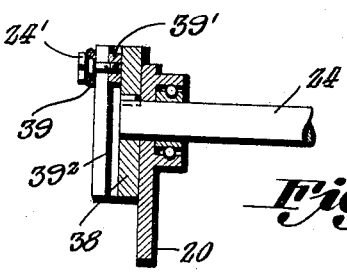
Figure 8 is a detail sectional view taken through the eccentric driving connection for the blade shaft.

As best illustrated in Figure 3 of the drawings the uppermost end of the shaft 48' for the roller 48 is adjustably mounted within the bracket arm 33 and for this purpose a set screw $48^2$ is mounted in the arm 33. A stop collar $48^3$ is fitted upon said shaft 48' for the retention of the entire mower blade 35 at a desired height. The unions between the pipes 29 and 30 and also such union of the pipe 29 with the hydrant and the pipe 30 with the motor are provided with suitable packings whereby leakage of the water under pressure will be prevented incident to the vibration caused by the mower while in motion.

After the device has been assembled and coupled up in the manner outlined in the description of the invention, the conduits 29 and 30 are then folded or otherwise swung one upon the other to dispose the mower in juxtaposition to the drum or roller 14 having the cable or cord 13 wound thereabout. The roller or wheel 48 is then set to guide the mower to cut circles or swaths in the lawn of different widths. The water is then turned on and the force of the same against the fins or blades in the housing of the water motor will in turn actuate the blade carrying shaft and wheels of the motor. The successive spirals described by the mower during its various circuits will automatically pay out or otherwise distribute the cord or cable 13.

The invention is susceptible of various changes in its form, proportions and minor details of construction, and the right is herein reserved to make such changes as properly fall within the scope of the appended claims.

Having thus described the invention, what is claimed is:—

1. A combined mower and sprinkler comprising a frame mounted upon propelling wheels, a fluid operated motor mounted upon the frame, said motor having a rotor, means operatively connecting the propelling wheels together, a cutting mechanism having a shaft operatively connected with the rotor of the motor, and a sprinkler adapted to receive exhaust fluid from the motor.

2. A combined mower and sprinkler comprising a frame mounted upon propelling wheels, a fluid operated motor mounted upon the frame said motor having a rotor, means operatively connecting the propelling wheels together, a cutting mechanism having a shaft operatively connected with the rotor of the motor and means for intermittently transferring the movement from the shaft of the cutting mechanism to the propelling wheels, and a sprinkler adapted to receive exhaust fluid from the motor.

3. A combined mower and sprinkler comprising a frame mounted upon propelling wheels, a fluid operated motor mounted upon the frame said motor having a rotor, means operatively connecting the propelling wheels together, a cutting mechanism having a shaft operatively connected with the rotor of the motor and a pawl and ratchet mechanism for intermittently moving the propelling wheels from the cutting shaft, and a sprinkler adapted to receive exhaust fluid from the motor.

4. In combination with a mower and sprinkler mounted upon propelling wheels, said mower having a fluid operated motor, of means operatively connecting the propelling wheels with the motor, a fluid supply pipe, a drum mounted thereon, a cable connected with the drum and adapted to be wound on and unwound from the same and operatively connected with the mower, and an extensible and contractible fluid conduit connected with said water supply pipe and the motor.

5. A combined mower and sprinkler comprising a frame mounted upon propelling wheels, a fluid operated motor mounted upon the frame said motor having a rotor, means operatively connecting the propelling wheels together, a cutting mechanism having a shaft operatively connected with the rotor of the motor, and a sprinkler adapted to receive exhaust fluid from the motor and discharge the same in fine streams at the rear of the cutting mechanism.

In testimony whereof I affix my signature.

FRANCIS W. WADE.